United States Patent [19]
Breese

[11] Patent Number: 5,637,042
[45] Date of Patent: Jun. 10, 1997

[54] DRIVE LINE ASSEMBLY WITH REDUCING TUBE YOKE

[75] Inventor: Douglas E. Breese, Northwood, Ohio

[73] Assignee: Dana Corporation, Toledo, Ohio

[21] Appl. No.: 407,769

[22] Filed: Mar. 21, 1995

[51] Int. Cl.$^6$ .................................................. F16C 3/02
[52] U.S. Cl. ..................... 464/183; 464/134; 464/179
[58] Field of Search ........................ 464/134, 179, 464/181, 182, 183

[56] References Cited

U.S. PATENT DOCUMENTS

| | | |
|---|---|---|
| 2,291,420 | 8/1942 | Swenson . |
| 2,577,692 | 12/1951 | Slaght . |
| 2,751,765 | 6/1956 | Rowland et al. ............... 464/181 X |
| 4,161,273 | 7/1979 | Jeffers . |
| 4,192,153 | 3/1980 | Fisher . |
| 4,279,275 | 7/1981 | Stanwood et al. ............. 464/181 X |
| 4,307,833 | 12/1981 | Barnard . |
| 4,348,874 | 9/1982 | Muller et al. . |
| 4,358,284 | 11/1982 | Federmann et al. . |
| 4,380,443 | 4/1983 | Federmann et al. . |
| 4,421,497 | 12/1983 | Federmann et al. . |
| 4,527,978 | 7/1985 | Zackrisson ................... 464/182 X |
| 4,663,819 | 5/1987 | Traylor . |
| 4,881,924 | 11/1989 | Gall . |
| 4,932,924 | 6/1990 | Löbel ............................ 464/181 |
| 4,952,195 | 8/1990 | Traylor . |
| 5,309,620 | 5/1994 | Shinohara et al. ........... 464/181 X |
| 5,320,579 | 6/1994 | Hoffmann ..................... 464/181 |

FOREIGN PATENT DOCUMENTS

| | | | |
|---|---|---|---|
| 73731 | 6/1978 | Japan ........................ | 464/183 |
| 405024455 | 2/1993 | Japan ........................ | 464/183 |
| 2040395 | 8/1980 | United Kingdom ....... | 464/134 |

*Primary Examiner*—Daniel P. Stodola
*Assistant Examiner*—Eileen A. Dunn
*Attorney, Agent, or Firm*—MacMillan, Sobanski & Todd

[57] ABSTRACT

A drive line assembly includes a cylindrically shaped driveshaft tube and a tube yoke, one end of the driveshaft tube fitting over the tube yoke in an interference fit sufficient to transfer torque between the driveshaft tube and the tube yoke, the tube yoke comprising a tube seat at one end for mating in a torque transferring relationship with the end of the driveshaft. The other end of the driveshaft tube yoke has a lug structure for transferring torque to other rotatable elements through a universal joint. The tube yoke has a diameter reducing portion intermediate the tube seat and the lug structure so that the lug structure is smaller in diameter than the drive shaft tube and the tube seat to facilitate the introduction of tooling to the lug structure during assembly operations of the universal joint.

19 Claims, 1 Drawing Sheet

DRIVE LINE ASSEMBLY WITH REDUCING TUBE YOKE

BACKGROUND OF THE INVENTION

This invention relates in general to drive line assemblies suitable for transferring power in a vehicle, and in particular to an improved drive line apparatus for transferring torque from a rotating tubular driveshaft to a universal joint assembly.

Metallic torque transmitting shafts and similar components are widely used for many different applications. In particular, metal torque transmitting shafts are frequently used in vehicular drive trains including axle shafts, yoke shafts and the like. In use, these shafts can be subjected to relatively large torque loads imposed on them by the vehicle engine to move the vehicle. It is desirable for these torque-bearing members to be as strong as possible while still being light weight. Typically, driveshaft members are hollow to provide the maximum strength for the weight involved. It is known that driveshafts must be rotated at speeds below their critical speed to avoid resonance which leads to self destruction. The critical speed for any given driveshaft is a function of the density, modulus and geometry of the material in the driveshaft. Generally, the smaller the driveshaft diameter, the lower the critical speed of the driveshaft. Therefore it is desirable for the driveshaft to be at least as large in diameter as a specified minimum size for a particular driveshaft length and composition of material.

Vehicle driveshafts usually are adapted with universal joint assemblies for connection to other rotating drive line elements. The universal joints help accommodate differences in angular alignment between two rotating elements, such as a transmission output shaft and a driveshaft tube. Universal joints further enable a small amount of relative movement between the driveshaft and an adjacent rotating part, such as a transmission output shaft or an axle assembly input shaft. In a typical vehicle driveline assembly the driveshaft tube is connected at each of its ends to a tube yoke which connects to a universal joint assembly. The universal joint assembly usually consists of a journal cross and four bearing assemblies. Typically assembly involves securing the universal joint into place with a bearing strap and a plurality of lug bolts. An important requirement for the assembly of the driveline apparatus is gaining access to various driveline elements for the insertion of tools necessary to complete the assembly. In particular it is important to be able to reach the lug bolts during the assembly of the universal joint. Power tooling is used, and the tooling must be accurately aligned to obtain the proper torque on the lug bolts.

Past attempts to lower the weight of vehicle driveshafts have resulted in replacing traditional two-piece steel driveshafts with lighter weight one-piece aluminum alloy driveshafts. This reduces the driveshaft weight, but, because it is longer, requires a larger diameter driveshaft for the same critical speed. The critical speed of the driveshaft can be increased by coveting the driveshaft with a high modulus coating, such as a resin matrix reinforced with graphite fibers, but this increases the manufacturing cost. It would be advantageous if there could be developed a driveline assembly which would enable the substitution of lighter weight aluminum alloys for the traditional steel tubes, and yet not require the use of expensive reinforcing coatings. Any solution to the problem would have to include the requisite access for the tooling needed to assemble the universal joints at the ends of the driveline tube.

SUMMARY OF THE INVENTION

A new drive line assembly has now been developed which permits the use of a larger diameter driveshaft tube while still allowing the requisite access for the tooling to put together the universal joint assembly. By using a larger diameter driveshaft, the driveshaft can be made of an aluminum alloy and yet not require an expensive reinforcing coating. The increase in the driveshaft diameter will increase the critical speed to a commercially acceptable level. In order to enable the use of a higher diameter driveshaft tube while still allowing the requisite access for the tooling to put together the universal joint assembly, there must be a diameter reduction element which provides a conversion from the larger diameter driveshaft tube to the smaller diameter lug structure of the tube yoke.

The drive line assembly includes a driveshaft tube and a tube yoke, with the driveshaft tube having a diameter greater than the general diameter of the lug structure of the tube yoke. The tube yoke has a diameter reducing portion which provides the reduction in diameter necessary to permit access of the tooling.

The driveshaft tube fits over the tube yoke in an interference fit sufficient to transfer torque between the driveshaft tube and the tube yoke. The tube yoke has a tube seat at one end for mating in a torque transferring relationship with the end of the driveshaft tube. The tube yoke has a lug structure at its other end for transferring torque to other rotatable elements through a universal joint. The lug structure is smaller in diameter than the drive shaft tube and the tube seat. The diameter reducing portion of the tube yoke is positioned intermediate the tube seat and the lug structure to facilitate the introduction of tooling to the lug structure during assembly operations of the universal joint. The lug structure provides the connection point of the universal joint to the tube yoke.

In a preferred embodiment of the invention, the tube seat is a formed element, and is not machined. Also, the tube yoke is preferably a unitary element, being of one piece and not welded, bolted or threaded together. A fillet weld can be used to attach the driveshaft tube to the tube yoke. Both the driveshaft tube and the tube yoke are preferably metallic, and most preferably of an aluminum alloy.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
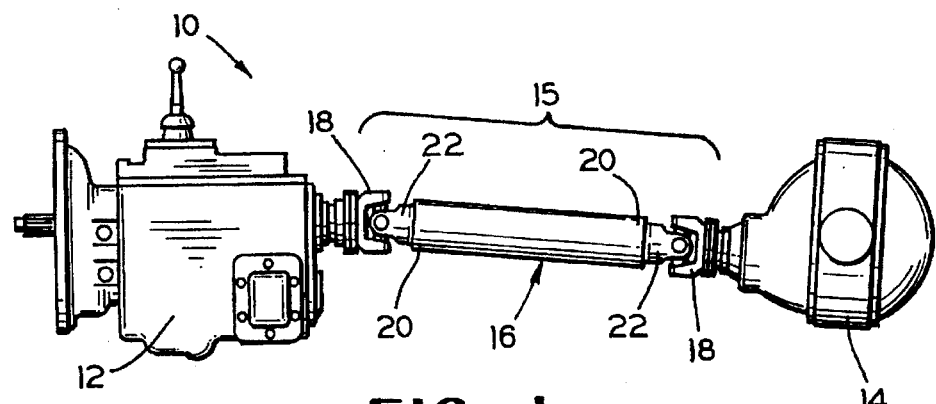
FIG. 1 is a schematic view in elevation of a drive train incorporating the drive line assembly of the invention.

As shown in FIG. 1, the drive train, indicated generally at 10, is comprised of transmission 12 connected to axle assembly 14 through drive line assembly 15. The drive line assembly includes a cylindrically shaped driveshaft or driveshaft tube 16. The driveshaft can be of any suitable material, but is preferably hollow and metallic, most preferably of a lightweight aluminum alloy such as a 6061 alloy. As is typical in vehicle drive trains, the transmission output shaft, not shown, and the axle assembly input shaft, not shown, are not coaxially aligned. Therefore, universal joints 18 are positioned at each end 20 of the driveshaft to rotatably connect the driveshaft to the transmission output and the axle assembly input. The connection between the ends 20 of the driveshaft and the universal joints is accomplished by tube yokes 22. The drive train apparatus described thus far is generally conventional, and is well known in the industry.

Figure 2:
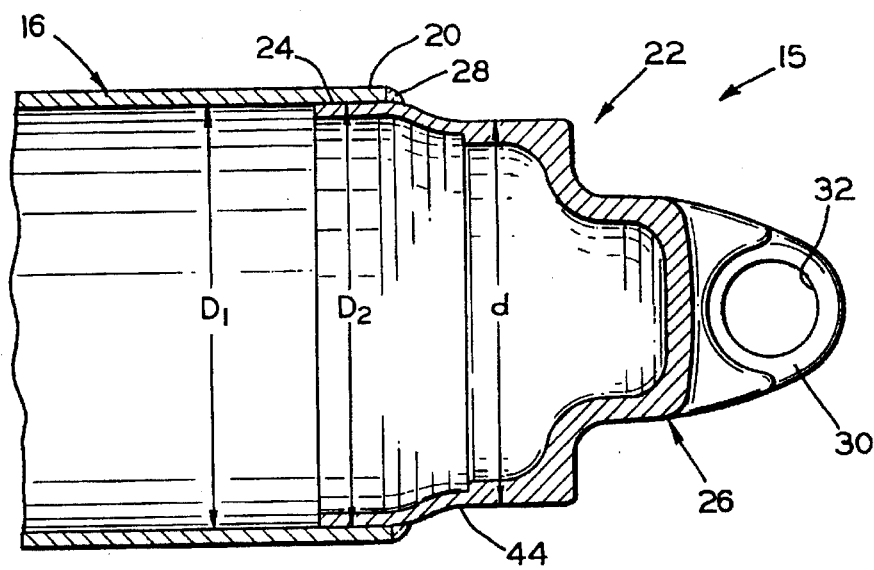
FIG. 2 is a schematic plan view, partially in cross-section, of a drive shaft and tube yoke in accordance with this invention.

As shown more clearly in FIG. 2, the tube yoke 22 is comprised of the tube seat 24 at one end, and the lug structure 26 at the other end. The tube yoke can be made of any suitable material, and is preferably metallic, being of an aluminum alloy. The tube yoke can be made by casting or by forging, and is preferably a formed element which is subjected to a draw and iron stamping process to set the final dimensions of the tube seat outside diameter $D_2$, thereby eliminating the necessity of machining the tube seat. The term "formed element" means that the element is pushed or shaped into its final form without the loss of any material, rather than being machined, turned or milled, which would involve the removal of material to obtain the final form. Since a formed element does not require a machining process, the formed element is less costly to manufacture. Also, the tube yoke is preferably a unitary element, which means it is of one piece, and is not welded, threaded or bolted together.

The draw and iron process is similar to a coining process and involves pressing or punching a workpiece into a draw and iron die. Prior to the draw and iron process, the workpiece is already generally formed into the net shape or final shape of the final part, either by a casting or a forging process. The draw and iron die is made of die steel. Forcing the relatively soft aluminum alloy with a single die stroke into the die, forms and smoothes the forged or cast surface of the tube seat into a part having the desired dimensions, generally within a tolerance about ±0.002 inches. The draw and iron process is well known to those skilled in the art.

The tube seat is adapted to mate or fit with the end 20 of the driveshaft tube 16 to enable torque to be transmitted between the driveshaft tube and the tube seat. The torque transmitting capacity of the connection between the driveshaft tube and the tube yoke is increased by providing a weld, such as fillet weld 28. Although a fillet weld is preferred, other welds could be used.

Figure 3:
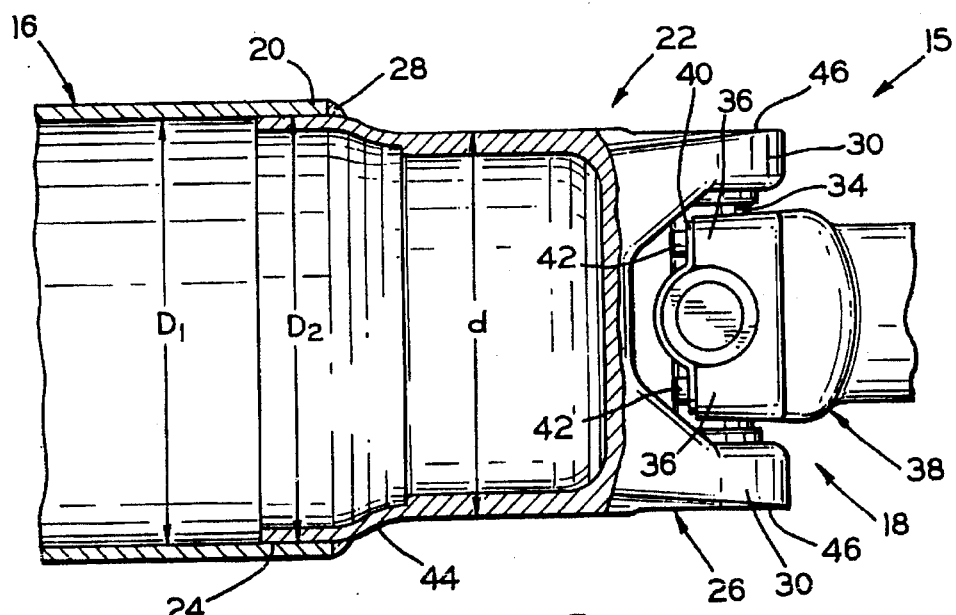
FIG. 3 is a schematic view in elevation, partially in cross section, of the drive line assembly illustrated in FIG. 2, rotated 90 degrees from the view in FIG. 2.

The lug structure is comprised of lug ears 30 adapted with cross orifices 32 which receive the universal joint bearing assemblies, not shown in FIG. 2, but shown as universal joint journal cross 34 in FIG. 3. The cross is connected to the end yoke lug ears 36 of the end yoke 38 to form the complete universal joint 18. The end yoke is connected to other rotatable drive train elements. The end yoke lug ears 36 can be held in place around the journal cross bearings by any retaining device, such as by bearing strap 40, as shown in FIG. 3. The bearing strap is secured to the end yoke lug ears by lug bolts 42, which can be threaded into the end yoke lug ears. Access must be provided to the lug bolts during assembly of the drive line assembly in order to secure the bearing strap into place. The lug structure 26 transmits torque through the universal joint, to or from other rotatable drive line elements, such as the transmission 12 and the axle assembly 14.

It can be seen that the generalized diameter d of the lug structure 26 is less than the outside diameter $D_2$ of the tube seat 24. Positioned intermediate the tube seat and the lug structure is the tube yoke diameter reducing portion 44 which provides for a change in diameter of the tube yoke to accommodate both the inside diameter $D_1$ of the enlarged driveshaft tube 16 and the smaller diameter d of the lug structure. It is to be understood that the lug structure is not usually perfectly cylindrical, and therefore does not have a definitive diameter. However, the lug structure usually has oppositely spaced, generally planar or arcuate faces, such as lug faces 46, shown more clearly in FIG. 3, which can be used to provide a generalized diameter of the lug structure. In the preferred embodiment of the invention, the general diameter d of the lug structure is within the range of from about 0.60 to about 0.95 of the tube seat diameter $D_2$. Most preferably, the general diameter d of the lug structure is within the range of from about 0.80 to about 0.93 of the tube seat diameter $D_2$. In a specific embodiment of the drive line assembly 15, the driveshaft and the tube seat are about 5 inches in diameter, and the lug structure is about 4 inches in diameter. This is expected to be sufficient to enable the use of an unreinforced aluminum alloy driveshaft tube while still providing access for tooling during fabrication of the universal joint 18.

The diameter reducing portion 44 is preferably designed with a smooth curve for ease of manufacture, but could also be formed with a step-like diameter reduction. It is important that the diameter reducing portion be positioned far enough away from the lug bolts that the tooling for the lug bolts, such as power wrenches, can be inserted in place. Preferably, the diameter reducing portion is positioned at least 2¾ inches from the lug bolts.

During the fabrication of the drive line assembly 15, the tube seat 24 is inserted into the end 20 of the driveshaft tube 16. The inside diameter $D_1$ of the driveshaft is preferably sized to be slightly smaller than the outside diameter $D_2$ of the tube seat. Preferably, the driveshaft tube inside diameter $D_1$ is within the range of from about 0.980 to about 0.999 of the tube seat diameter $D_2$ prior to the insertion of the tube seat into the driveshaft tube. After the insertion of the tube seat into the driveshaft, the tube seat becomes slightly deformed since at that point the tube seat diameter $D_2$ equals the driveshaft tube inside diameter $D_1$. By making the tube seat diameter $D_2$ slightly larger than the driveshaft tube inside diameter $D_1$ prior to insertion of the tube seat into the driveshaft, the two parts will have an interference fit or press fit, which provides some torque transmitting capacity.

In operation, a drive line assembly 15 includes a relatively large driveshaft tube 16 and a tube yoke 22 fitting within the end 20 of the tube. The tube yoke has a lug structure 26 for connection through a universal joint 18 to other rotating parts of the drive train. The lug structure is relatively smaller in diameter than the driveshaft tube, and the tube yoke is adapted with a diameter reducing portion 44 which provides a transition between the relatively large diameter $D_1$ of the driveshaft tube and the relatively small diameter d of the lug structure. This allows the insertion of the tooling necessary for securing the lug bolts 42 within the universal joint assembly 18.

It will be evident from the foregoing that various modifications can be made to this invention. Such, however are considered as being within the scope of the invention.

What is claimed is:

1. A drive line assembly comprising:
   a driveshaft tube formed from a metallic material and having a substantially uniform wall thickness, said driveshaft tube terminating in an axially extending cylindrical end portion;

a diameter reducing portion formed from a metallic material and having a substantially uniform wall thickness, said diameter reducing portion including an axially extending cylindrical first end which is co-axial with and permanently fixed to said axially extending cylindrical end portion of said driveshaft tube, said diameter reducing portion further including an axially extending cylindrical second end, said axially extending cylindrical first end of said diameter reducing portion defining a first diameter, said axially extending cylindrical second end of said diameter reducing portion defining a second diameter, said first diameter being larger than said second diameter; and a tube yoke formed from a metallic material and including a pair of opposed lug ears having respective orifices formed therethrough, said tube yoke including an axially extending cylindrical end portion which is co-axial with and permanently fixed to said axially extending cylindrical second end of said diameter reducing portion for axial and rotational movement therewith.

2. The drive line assembly defined in claim 1 wherein said driveshaft tube is formed from an aluminum alloy.

3. The drive line assembly defined in claim 1 wherein said diameter reducing portion is formed from an aluminum alloy.

4. The drive line assembly defined in claim 1 wherein said tube yoke is formed from an aluminum alloy.

5. The drive line assembly defined in claim 1 wherein said driveshaft tube, said diameter reducing portion, and said tube yoke are all formed from an aluminum alloy.

6. The drive line assembly defined in claim 1 wherein said driveshaft tube is welded to said diameter reducing portion.

7. The drive line assembly defined in claim 1 wherein said diameter reducing portion is formed homogeneously with said tube yoke.

8. The drive line assembly defined in claim 1 wherein said driveshaft tube is welded to said diameter reducing portion and said diameter reducing portion is formed homogeneously with said tube yoke.

9. The drive line assembly defined in claim 1 wherein said first diameter is about five inches and said second diameter is about four inches.

10. The drive line assembly defined in claim 1 further including a universal joint assembly connected with said tube yoke.

11. A drive line assembly comprising:

a driveshaft tube formed from a metallic material and having a substantially uniform wall thickness, said driveshaft tube terminating in an axially extending end portion; and a tube yoke formed from a metallic material and including a homogenous diameter reducing portion having a substantially uniform wall thickness, said diameter reducing portion including an axially extending first end which is co-axial with and permanently fixed to said axially extending end portion of said driveshaft tube, said diameter reducing portion further including an axially extending second end, said axially extending first end of said diameter reducing portion defining a first diameter, said axially extending second end of said diameter reducing portion defining a second diameter, said first diameter being larger than said second diameter, said tube yoke further including a pair of opposed lug ears extending from said second end of said diameter reducing portion and having respective orifices formed therethrough.

12. The drive line assembly defined in claim 11 further including a universal joint assembly connected with said tube yoke.

13. The drive line assembly defined in claim 11 wherein said axially extending end portion of said driveshaft tube and said axially extending first end of said diameter reducing portion are cylindrical.

14. The drive line assembly defined in claim 11 wherein said axially extending first end of said diameter reducing portion and said axially extending second end of said diameter reducing portion are cylindrical.

15. The drive line assembly defined in claim 11 wherein said driveshaft tube is formed from an aluminum alloy.

16. The drive line assembly defined in claim 11 wherein said tube yoke is formed from an aluminum alloy.

17. The drive line assembly defined in claim 11 wherein said driveshaft tube and said tube yoke are both formed from an aluminum alloy.

18. The drive line assembly defined in claim 11 wherein said driveshaft tube is welded to said first end of said diameter reducing portion of said tube yoke.

19. The drive line assembly defined in claim 11 wherein said first diameter is about five inches and said second diameter is about four inches.

* * * * *